US 9,460,316 B2

(12) United States Patent
Tanamoto et al.

(10) Patent No.: US 9,460,316 B2
(45) Date of Patent: Oct. 4, 2016

(54) AUTHENTICATION DEVICE, AUTHENTICATION METHOD, AND COMPUTER PROGRAM PRODUCT

(71) Applicant: KABUSHIKI KAISHA TOSHIBA, Tokyo (JP)

(72) Inventors: Tetsufumi Tanamoto, Kawasaki (JP); Takao Marukame, Tokyo (JP); Shinichi Yasuda, Tokyo (JP); Yuichiro Mitani, Kanagawa (JP); Atsushi Shimbo, Tokyo (JP); Tatsuya Kishi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 132 days.

(21) Appl. No.: 14/190,463

(22) Filed: Feb. 26, 2014

(65) Prior Publication Data

US 2014/0372671 A1 Dec. 18, 2014

(30) Foreign Application Priority Data

Jun. 13, 2013 (JP) .................. 2013-124513

(51) Int. Cl.
| | |
|---|---|
| *G06F 12/14* | (2006.01) |
| *G06F 21/73* | (2013.01) |
| *G11C 11/16* | (2006.01) |
| *G11C 13/00* | (2006.01) |
| *G11C 16/10* | (2006.01) |
| *G11C 16/34* | (2006.01) |
| *G11C 7/24* | (2006.01) |

(52) U.S. Cl.
CPC ............... *G06F 21/73* (2013.01); *G11C 7/24* (2013.01); *G11C 11/16* (2013.01); *G11C 11/1675* (2013.01); *G11C 13/0035* (2013.01); *G11C 16/10* (2013.01); *G11C 16/349* (2013.01)

(58) Field of Classification Search
CPC ..................................................... G06F 21/73

USPC ......................................................... 711/103
See application file for complete search history.

(56) References Cited

U.S. PATENT DOCUMENTS 7,904,731 B2  3/2011 Devadas et al.
(Continued)

FOREIGN PATENT DOCUMENTS

JP  2000-235636  8/2000

OTHER PUBLICATIONS

Pim Tuyls, et al., "Read-Proof Hardware from Protective Coatings", Cryptographic Hardware and Embedded System, CHES 2006, Lecture Notes in Computer Sciences, vol. 4249, pp. 369-383, Oct. 10-13, 2006.

*Primary Examiner* — David X Yi
*Assistant Examiner* — Zubair Ahmed
(74) *Attorney, Agent, or Firm* — Finnegan, Henderson, Farabow, Garrett & Dunner LLP (57) ABSTRACT

According to an embodiment, an authentication device includes an acquiring unit, a predicting unit, and an authenticating unit. The acquiring unit is configured to acquire performance information of a first device that is a device to be authenticated. The predicting unit is configured to predict performance information of a second device that is a device being a reference for authentication according to a change with time from initial performance information. The authenticating unit is configured to perform an authentication process of determining whether or not the first device falls into the second device on a basis of a degree of agreement between the performance information acquired by the acquiring unit and the performance information predicted by the predicting unit.

3 Claims, 8 Drawing Sheets

(56) References Cited

U.S. PATENT DOCUMENTS

| | | | |
|---|---|---|---|
| 2009/0164789 A1* | 6/2009 | Carvounas | G06F 21/445 713/176 |
| 2012/0020145 A1 | 1/2012 | Huber et al. | |
| 2014/0126306 A1* | 5/2014 | Otterstedt | G11C 7/06 365/189.07 |
| 2015/0192637 A1* | 7/2015 | Falk | G06F 21/55 326/16 |

* cited by examiner

FIG.1A

AUTHENTICATION AREA    MEMORY USE AREA

FIG.1B

AUTHENTICATION AREA    MEMORY USE AREA

AUTHENTICATION DEVICE, AUTHENTICATION METHOD, AND COMPUTER PROGRAM PRODUCT

CROSS-REFERENCE TO RELATED APPLICATIONS

This application is based upon and claims the benefit of priority from Japanese Patent Application No. 2013-124513, filed on Jun. 13, 2013; the entire contents of which are incorporated herein by reference.

FIELD

Embodiments described herein relate generally to an authentication device, an authentication method, and a computer program product.

BACKGROUND

For IC cards used as cache cards, credit cards, tickets of transportation systems (such as trains and buses), etc., identification functions of identifying the users of IC cards are important, and security enhancement is being increasingly important with the expanding use of IC cards. In recent years, some memory cards, which have been used only to save personal data, are also provided with the identification functions, and advancement in the identification functions of portable devices has become a technical challenge.

Under such circumstances, researches and developments on using variation in the characteristics of individual devices as "chip fingerprints" are in progress. These are known as physically unclonable function (PUF). For example, there is known a technology of using distribution of crystal defects in a predetermined area of a semiconductor substrate as an ID for identifying the semiconductor substrate itself.

With the technology of the related art using factory-default distribution of crystal defects as an ID, the distribution of crystal defects is assumed to remain unchanged. As is well known, however, a semiconductor chip suffers from much deterioration over time while being used, and the distribution of crystal defects of the semiconductor chip thus changes from the factory-default state in many cases. There are therefore problems in the related art that identification becomes difficult and the accuracy of authentication is lowered as the period of use (the number of uses) of a device increases and the defects increase.

DETAILED DESCRIPTION

According to an embodiment, an authentication device includes an acquiring unit, a predicting unit, and an authenticating unit. The acquiring unit is configured to acquire performance information of a first device that is a device to be authenticated. The predicting unit is configured to predict performance information of a second device that is a device being a reference for authentication according to a change with time from initial performance information. The authenticating unit is configured to perform an authentication process of determining whether or not the first device falls into the second device on a basis of a degree of agreement between the performance information acquired by the acquiring unit and the performance information predicted by the predicting unit.

Various embodiments will be described below in detail with reference to the accompanying drawings.

First Embodiment

In the embodiment, a device to be authenticated is an electronic device having NAND flash memory, and can be an IC card, a portable phone, a smart phone, or a tablet information terminal, for example.

Figure 1A:
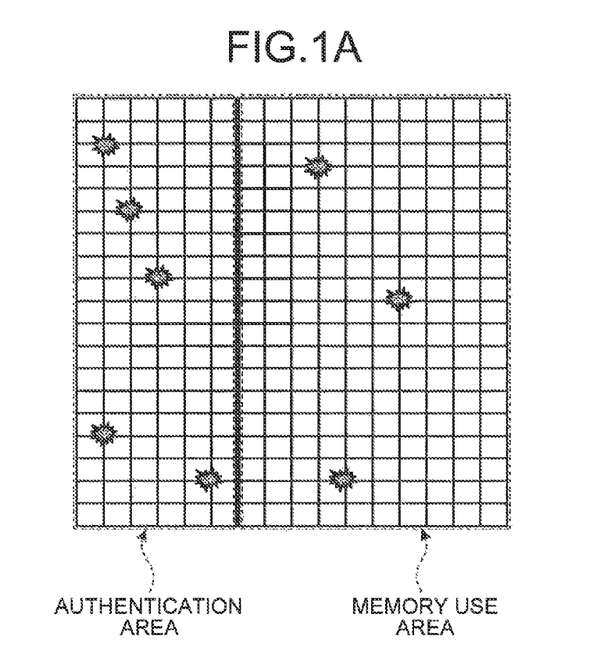
FIGS. 1A and 1B are diagrams illustrating an increase in defective memory cells with the number of uses according to an embodiment.
Figure 1B:
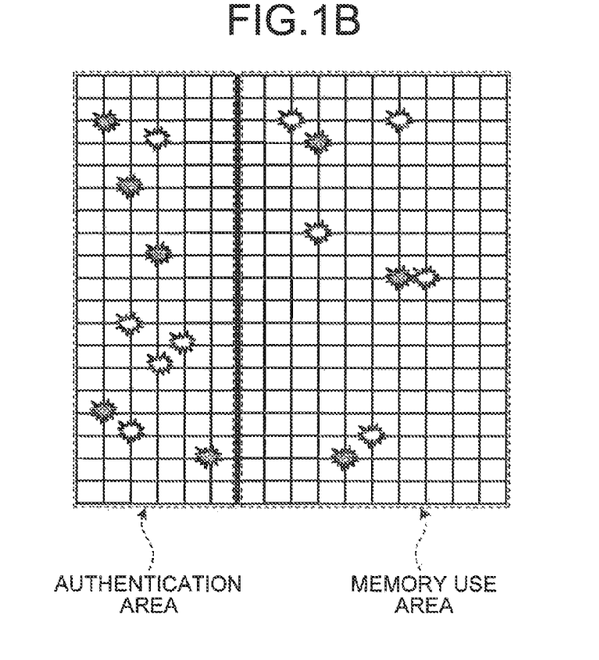

FIGS. 1A and 1B are diagrams illustrating an increase in the number of defective memory cells contained in a memory cell array of NAND flash memory with the number of uses (the number of rewrites). A memory cell array includes multiple memory cells arranged in a matrix on a semiconductor substrate. In the example of FIGS. 1A and 1B, intersections of multiple lines extending in the row direction (the horizontal direction in FIGS. 1A and 1B) and multiple lines extending in the column direction (the vertical direction in FIGS. 1A and 1B) correspond to memory cells. In addition, an area of the memory cell array used for authentication, which will be described later, is referred to as an authentication area and the remaining area is referred to as a memory use area in FIGS. 1A and 1B.

FIG. 1A is a diagram illustrating initial (factory default, for example) distribution of defective memory cells. FIG. 1B is a diagram illustrating distribution of defective memory cells when the number of uses (which can also be regarded as the period of use reached a predetermined value. As can be seen in FIGS. 1A and 1B, the number of defective memory cells has increased by five in each of the authentication area and the memory use area in this example.

Figure 2:
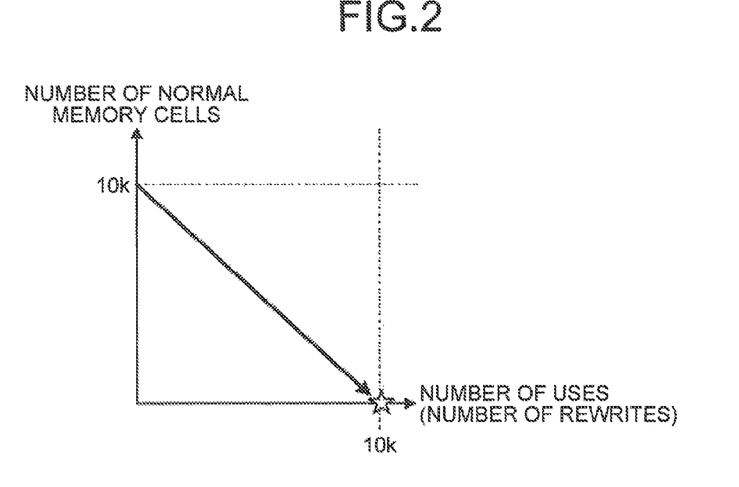
FIG. 2 is a graph illustrating a relation between the number of defective memory cells and the number of uses according to the embodiment.
Figure 3:
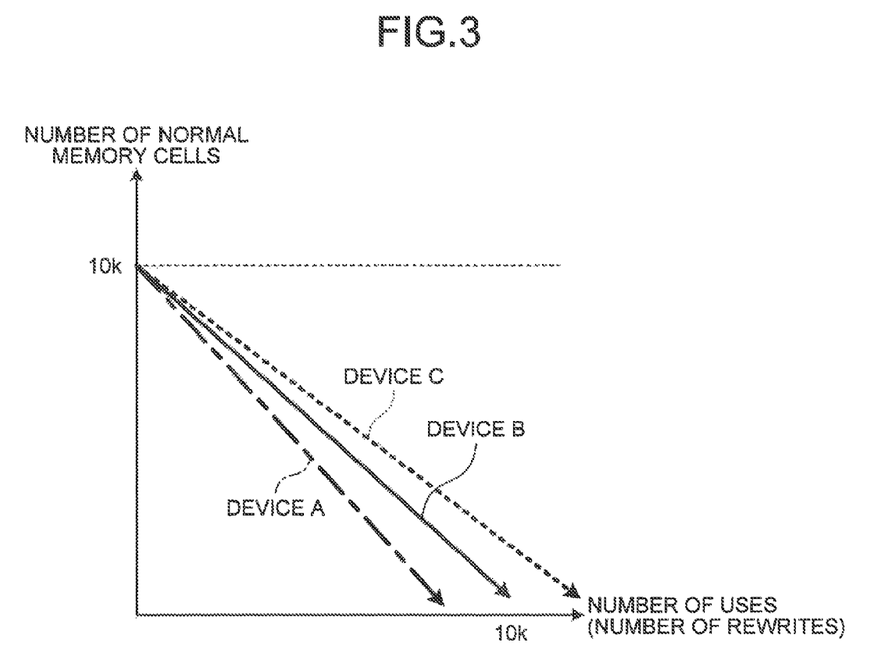
FIG. 3 is a graph illustrating the manner in which defective memory cells of each device increase according to the embodiment.

FIG. 2 is a graph schematically illustrating the relation between the number of normal memory cells (from a different perspective, the number of defective memory cells) and the number of uses (the number of rewrites). As can be seen in FIG. 2, the number of defective memory cells increases with the number of uses and there will ultimately be no cells that can be used as memory. This is also related to the fact that guaranteed use of various memories is limited to about 10E5 times, for example. The embodiment is characterized in authenticating a device on which a memory set is mounted by using a fact that, depending on individual memory sets (memory cell arrays), there is a difference in the manner in which the defective memory cells increase. FIG. 3 is a graph schematically expressing the manner in which defective memory cells increase in each of three devices (device A, device B, and device C). As can also be seen in FIG. 3, the slope of the line representing the relation between the number of defective memory cells and the number of uses differs from device to device (that is, the manner in which defective memory cells increase differs from device to device).

Figure 4:
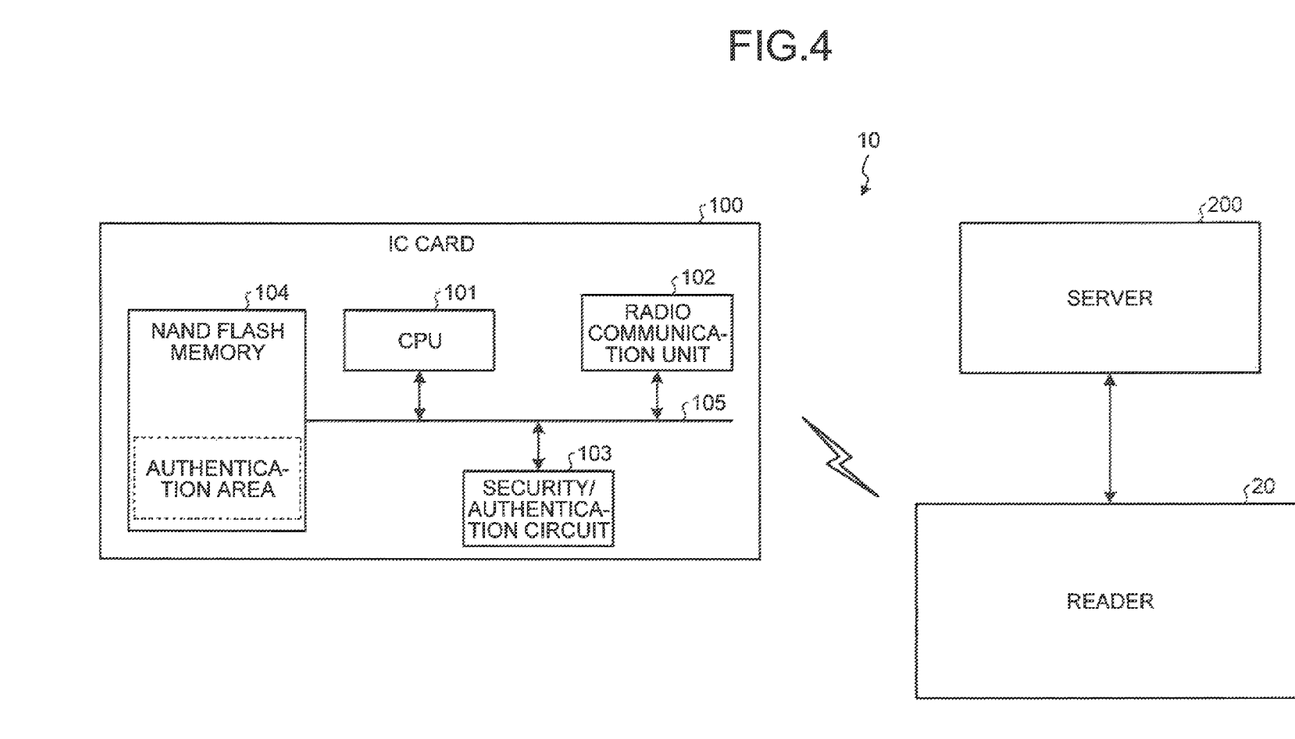
FIG. 4 is a diagram illustrating an exemplary configuration of an authentication system according to a first embodiment.

FIG. 4 is a diagram illustrating an exemplary configuration of an authentication system 10 according to the embodiment. As illustrated in FIG. 4, the authentication system 10 includes a device 100, a reader 20, and a server 200. While only one device 100 is illustrated in FIG. 4 for convenience of explanation, the number of devices 100 is not limited to one but any number of devices 100 may be included in the authentication system 10. The device 100 is an IC card used as a credit card or a cache card in this example, but is not limited thereto. The reader 20 is a device to acquire (read) information (ID information) used for authentication of the device 100 from the device 100. The reader 20 is an automated teller machine (ATM) of a bank or the like in this example, but is not limited thereto. The server 200 is connected to the reader 20 in a manner that the server 200 can communicate with the reader 20, and has a function of authenticating the device 100. Details will be described later.

First, specific details of the device 100 will be described. As illustrated in FIG. 4, the device 100 includes a CPU 101, a radio communication unit 102, a security authentication circuit 103, and NAND flash memory 104, which are connected with one another via a bus 105. The CPU 101 controls overall, operation of the entire device 100.

The radio communication unit 102 is means used for radio communication with the reader 20. The radio communication between the device 100 and the reader 20 is near field communication in the embodiment, but is not limited thereto. In the embodiment, the radio communication unit 102 has a coil and the reader 20 has an antenna with a coil to which alternating current is supplied. When a user having the device 100 puts the device 100 closer to the reader 20 (for example, when a user holds an IC card over the reader 20), current is generated in the coil in the radio communication unit 102 by electromagnetic induction. The reader 20 then detects the approach of the device 100 by detecting a change in the load on the antenna, and notifies the server 200. The server 200 in receipt of the notification performs control to modulate a radio wave to transmit a challenge signal requesting ID information (in this example, information indicating distribution of defective memory cells in the authentication area) to be used for authentication of the device 100 to the device 100 via the reader 20.

The security/authentication circuit 103 can detect the challenge signal transmitted from the reader 20 (the server 200) by detecting the current generated in the coil in the radio communication unit 102. When a challenge signal transmitted from the reader 20 is detected, the security/authentication circuit 103 performs a process of detecting defective memory cells present in the authentication area of the memory cell array of the NAND flash memory 104 to obtain information (hereinafter may also referred to as "defect pattern information") indicating distribution of defective memory cells in the authentication area. In NAND flash memory, for example, a phenomenon that the amount of defects generated in a tunneling film increases and the stress induced leakage current (SILC) increases as the number of use (the period of use) increases can be found. Thus, the amount of SILO can be used for determination of defective memory cells. For example, a memory cell array may be divided into multiple blocks (areas), the amount of charges Qp and the amount of holes Qh may be measured, and the measurement result may be used as the defect pattern information (ID information). The security/authentication circuit 103 then performs control to transmit the defect pattern information to the reader 20 in response to the challenge signal. The reader 20 then transfers the defect pattern information from the device 100 to the server 200.

Figure 5:
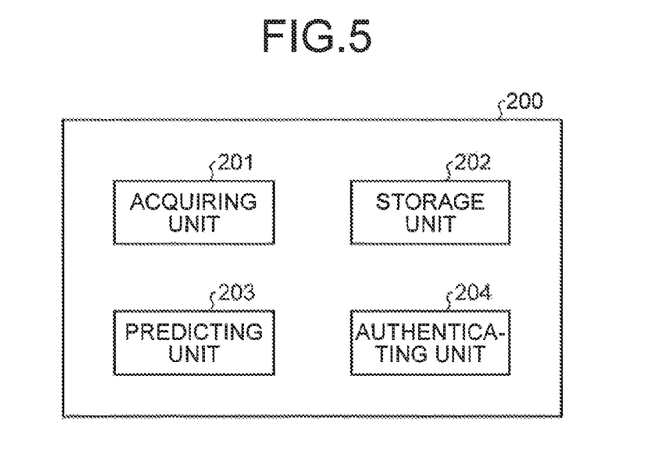
FIG. 5 is a diagram illustrating an exemplary functional configuration of a server according to the first embodiment.

Next, specific details of the server 200 will be described. FIG. 5 is a block diagram illustrating an exemplary functional configuration of the server 200. In this example, the server 200 corresponds to an "authentication device" in the claims, but the authentication device is not limited thereto. As illustrated in FIG. 5, the server 200 includes an acquiring unit 201, a storage unit 202, a predicting unit 203, and an authenticating unit 204.

The acquiring unit 201 acquires performance information of the device 100 (corresponding to a "first device" in the claims) to be authenticated. In this embodiment, upon receiving notification information indicating that approach of the device 100 is detected from the reader 20, the acquiring unit 201 performs control to transmit a challenge signal requesting defect pattern information to the device 100 via the reader 20. The acquiring unit 201 then acquires defect pattern information transmitted from the device 100 via the reader 20.

The storage unit 202 stores therein various types of data. More specifically, the storage unit 202 stores therein, initial performance information of a device (corresponding to a "device A" when authentication on whether or not a device approaching to the server 200 is the "device A" is performed, for example; corresponding to a "second device" in the claims) that is a reference for authentication as an initial value (default value). Herein, the performance information, refers to information indicating the state of the NAND flash memory 104. More specifically, the performance information is information (defect pattern information) indicating distribution of defective memory cells included in the NAND flash memory 104. In the embodiment, the performance information is defect pattern information indicating distribution of defective memory cells within the authentication area of the memory cell array of the NAND flash memory 104, and the storage unit 202 stores therein factory-default defect pattern information, of a device (may also be referred to as a "second device" in the description, below for convenience of explanation) that is a reference for authentication as an initial value.

The predicting unit 203 predicts the performance information of the second device (the device that is a reference for authentication) according to a change with time from the initial performance information. In the embodiment, the storage unit 202 stores therein experimental data for estimating how the distribution of defective memory cells in the authentication area changes with time, and the predicting unit 203 predicts defect pattern information, each time a certain period elapses (for example, each time defect pattern information is acquired by the acquiring unit 201) on the basis of the experimental data stored in the storage unit 202, and registers the predicted defect pattern information in the storage unit 202. As a result, the defect pattern information registered in the storage unit 202 is sequentially updated from the factory-default defect pattern information.

Alternatively, the predicting unit 203 may predict defect pattern information of the second device on the basis of the number of reads and the number of writes (that is, the number of uses) of the device 100 to be authenticated, for example. Basically, the predicting unit 203 may predict performance information of the second device according to a change with time from the initial performance information in any manner. In the case where the predicting unit 203 predicts the defect pattern information of the second device on the basis of the number of uses of the device 100 to be authenticated, the acquiring unit 201, in receipt of the no information indicating that approach of the device 100 is detected from the reader 20, controls the reader 20 to transmit a signal requesting the number of uses together with the challenge signal described above to the device 100. The acquiring unit 201 then acquires the defect pattern information and use number information indicating the number of uses of the device 100 from the device 100 via the reader 20. The predicting unit 203 may then predict the defect pattern information of the second device on the basis of the use number information acquired by the acquiring unit 201 and the experimental data stored in the storage unit 202, and register the predicted defect pattern information in the storage unit 202.

The authenticating unit 204 performs an authentication process of determining whether or not the device 100 to be authenticated falls into the device (second device) that is a reference for authentication on the basis of the degree of agreement between the performance information acquired by the acquiring unit 201 and the performance information predicted by the predicting unit 203. In the embodiment, the defect pattern information indicating the performance information is expressed by a bit string, and thus, the authenticating unit 204 calculates a Hamming distance between a bit string representing the defect pattern information acquired by the acquiring unit 201 and a bit string representing the defect pattern information (the latest defect pattern information registered in the storage unit 202) predicted by the predicting unit 203, and determines that the device 100 to be authenticated falls into the second device if the calculated Hamming distance is equal to or smaller than a threshold (that is, if the degree of agreement is a predetermined value or higher).

While the defect pattern information indicating the distribution of defective memories in the authentication area is used as the performance information in the embodiment, the performance information is not limited thereto and defect pattern information indicating distribution of defective memory cells in the memory use area may be used as the performance information. Basically, defect pattern information indicating distribution of defective memory cells included in the NAND flash memory 104 can be used as performance information.

Alternatively, defect number information indicating the number of defects included in the NAND flash memory 104 (which may be information indicating the number of defective memory cells in the authentication area or information indicating the number of defective memory cells in the memory use area) may be used as the performance information, or both the defect pattern information and the defect number information may be used as the performance information, for example. In the case where the defect number information is used as the performance information, for example, the acquiring unit 201, in receipt of the notification information indicating that approach of the device 100 is detected from the reader 20, performs controls to transmit the challenge signal described above to the device 100 via the reader 20. When the challenge signal transmitted from the reader 20 (the server 200) is detected, the device 100 performs a process of detecting defective memory cells present in the authentication area of the memory cell, array of the NAND flash memory 104, and transmits the defect number information indicating the number of defective memory cells in the authentication area to the reader 20. The reader 20 then transmits the defect number information received from the device 100 to the server 200, and the acquiring unit 201 acquires the defect number information.

The storage unit 202 stores therein factory-default defect number information of the second device as an initial value, and the predicting unit 203 predicts defect number information according to a change with time from the factory-default defect number information. For example, the storage unit 202 stores therein experimental data for estimating the increasing rate of the number of defective memory cells in the authentication area, history of the defect number information predicted by the predicting unit 203, and the like, and the predicting unit 203 can predict the defect number information each time a certain period elapses (for example, each time defect number information is acquired by the acquiring unit 201) on the basis of the experimental data, the history of results of predicting the defect number information, and the like stored in the storage unit 202, and register the predicted defect number information in the storage unit 202. It is the simplest to use the last prediction value and the prediction value before the last for the increasing rate of the defective memory cells, for example, but the number of defective memory cells can be more accurately predicted by approximating a predetermined number of previous prediction values by a quadratic or higher-order algebraic expression and storing coefficients of the respective orders.

The authenticating unit 204 determines that the device 100 to be authenticated falls into the second device if a difference between the number of defective memory cells indicated by the defect number information acquired by the acquiring unit 201 and the number of defective memory cells indicated by the defect number information predicted by the predicting unit 203 (the latest defect number information registered in the storage unit 202) is equal to or smaller than a threshold.

In the embodiment, the hardware configuration of the server 200 uses a hardware configuration of a computer system including a CPU, a ROM, a RAM, and the like. The functions of the respective units (the acquiring unit 201, the predicting unit 203, and the authenticating unit 204) of the server 200 described above are implemented by expanding and executing programs stored in the ROM or the like in the RAM by the CPU. Alternatively, however, some of the functions of the respective units of the server 200 described above may be implemented by dedicated hardware circuits, for example. Furthermore, the storage unit 202 described above can be realized by a ROM, a RAM or an auxiliary storage device such as an HDD.

Figure 6:
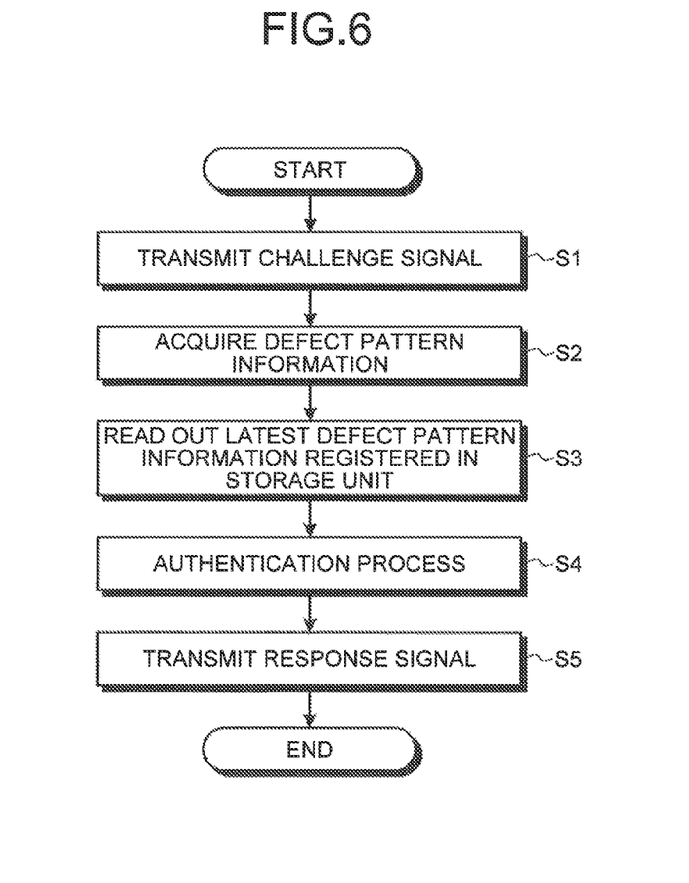
FIG. 6 is a flowchart illustrating exemplary operation of the server according to the first embodiment.

FIG. 6 is a flowchart illustrating exemplary operation of the server 200 according to the embodiment. Upon receiving notification information indicating that approach of the device 100 is detected from the reader 20, the server 200 (the acquiring unit 201) performs control to transmit a challenge signal requesting defect pattern information to the device 100 to be authenticated via the reader 20 (step S1). The acquiring unit 201 then acquires the defect pattern information from the device 100 to be authenticated via the reader 20 (step S2). Subsequently, the authenticating unit 204 reads out the latest defect pattern information registered in the storage unit 202 at this point (the defect pattern information of the second device predicted by the predicting unit 203) (step S3). The authenticating unit 204 then performs an authentication process of determining whether or not the device 100 to be authenticated falls into the second device (a device that is a reference for authentication) (step S4), and performs control to transmit a response signal indicating the result of the authentication process to the device 100 via the reader 20 (step S5). More specifically, the authenticating unit 204 calculates a Hamming distance between a bit string representing the defect pattern information acquired in step S1 and a bit string representing the defect pattern information read in step S3, and determines whether or not the calculated Hamming distance is equal to or smaller than the threshold. If the calculated Hamming distance is equal to or smaller than the threshold, the authenticating unit 204 determines that the device 100 to be authenticated falls into the second device and performs control to transmit a response signal indicating that the device 100 is authenticated to the device 100 via the reader 20. If, on the other hand, the calculated Hamming distance is larger than the threshold, the authenticating unit 204 determines that the device 100 to be authenticated does not fall into the device 100 and performs control to transmit a response signal indicating that authentication of the device 100 is failed to the device 100 via the reader 20.

As described above, in the embodiment, authentication of the device 100 to be authenticated is performed on the basis of defect pattern information of the second device, which is a reference for authentication, according to a change with time from the factory-default defect pattern information (an example of performance information), which allows highly accurate authentication of the device 100 regardless of the usage of the device 100.

Second Embodiment

Next, a second embodiment will, be described. The second embodiment is different from the first embodiment described, above in that a device (first device) to be authenticated is an electronic device having a random number generation circuit including multiple ring oscillators and in that performance information is information indicating the quality of a random number generated by each of the ring oscillators. Description of parts that are the same as those in the first embodiment described above will not be repeated as appropriate.

A random number generation circuit using ring oscillators and the like are used in many NFCs including IC cards. The random number generation circuit is an electronic substrate within a thin package when used, and is therefore one of devices susceptible to external environment. In particular, when used together with a commuter pass or the like, the device is used almost every day and thus suffers from severe deterioration. Periodic ID maintenance from factory shipment is required.

Figure 7:
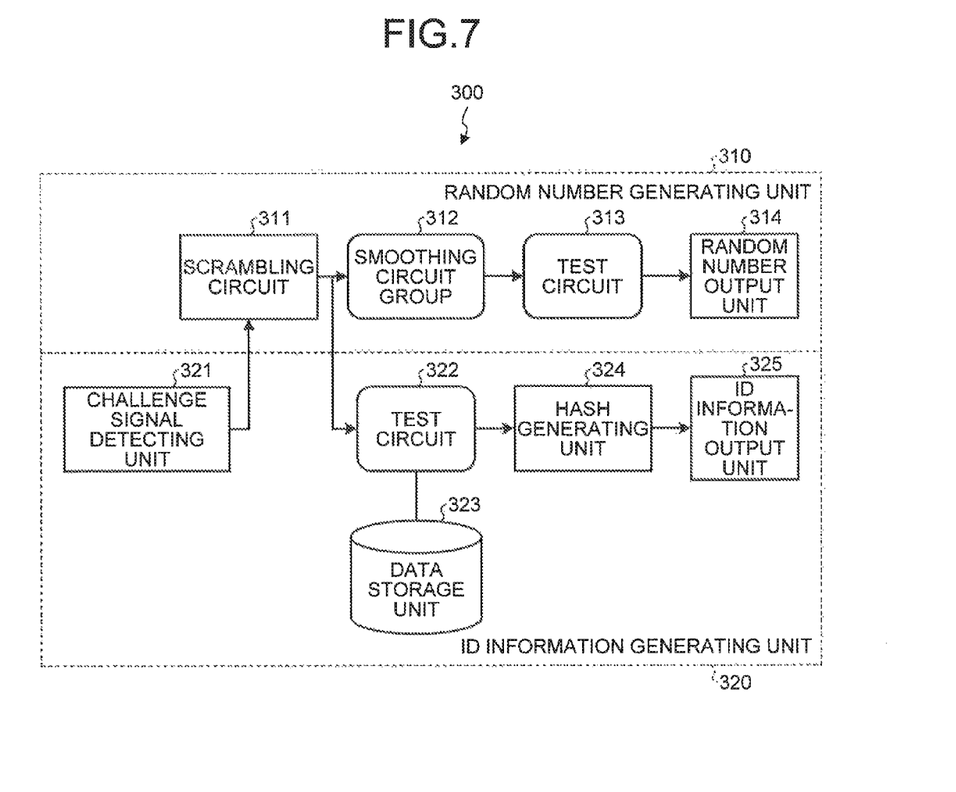
FIG. 7 is a diagram illustrating an exemplary schematic configuration of as random number generation circuit according to a second embodiment.

Herein, the random number generation circuit is present in the security/authentication circuit 103 illustrated in FIG. 4, and thus, the electronic device having the random number generation circuit is assumed to be an IC card as in the first embodiment and referred to as the device 100. Furthermore, the reader and the server have the same basic configurations as those in the first embodiment, and will thus be referred to in the same manner (the reader 20 and the server 200) as in the first embodiment. FIG. 7 is a block diagram illustrating an exemplary configuration of a random number generation circuit 300 according to the second embodiment. The random number generation circuit 300 includes a random number generating unit 310 that functions as a typical random number generation circuit, and an ID information generating unit 320 that generates ID information in response to a challenge signal from the server 200. Details will be described later.

Figure 8:
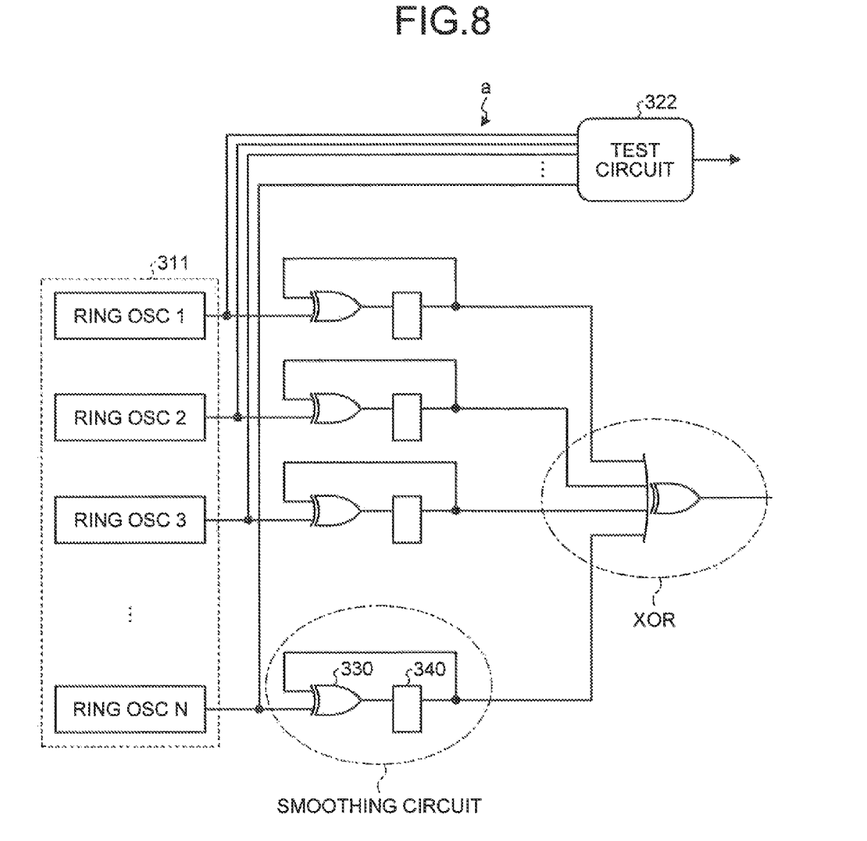
FIG. 8 is a diagram illustrating a detailed exemplary configuration of the random number generation circuit, according to the second embodiment.
Figure 9:
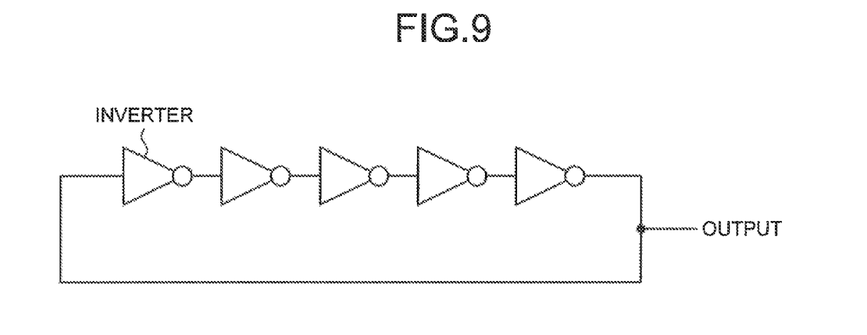
FIG. 9 is a diagram illustrating an exemplary configuration of a ring oscillator according to the second embodiment.

The random number generation circuit 300 includes multiple ring oscillators 1 to N (RING OSC 1 to RING OSC N) as illustrated in FIG. 8, FIG. 8 illustrates arrangement of N (≥1) ring oscillators. FIG. 9 is a diagram illustrating an example of a single ring oscillator. While an exemplary configuration in which an odd number (five in the example of FIG. 9) of inverters are connected in a ring for oscillation is presented in the example of FIG. 9 for easy understanding of the principle, a ring oscillator may alternatively be realized by using XOR and NAND circuits.

A typical random number generation circuit has a smoothing circuit as illustrated in FIG. 8 inserted so as to reduce variation in random number outputs among ring oscillators, and undergoes a process of executing an XOR (exclusive OR) logical operation on data from the ring oscillators. The smoothing circuit includes an XOR gate 330 and a flip-flop circuit 340 in the example of FIG. 8, but the smoothing circuit is not limited thereto. Each ring oscillator presents a random number characteristic of the ring oscillator depending on process variations of transistors constituting the ring oscillator and, at the same time, depending on the external environment in which the ring oscillator is placed due to optimum automatic layout/wiring in the circuit. Ideally, it is desired that all the ring oscillators output random numbers in which 0 and 1 are well balanced, but there are some ring oscillators that output random numbers in which 0 and 1 are ill balanced owing to arrangement of transistors constituting the ring oscillators or differences in thresholds of the transistors. Some ring oscillators only generate random numbers mostly composed of 0 or 1.

The characteristics differ between individual ring oscillators in such a manner that a ring oscillator 1 (RING OSC 1) and a ring oscillator 2 (RING OSC 2) illustrated in FIG. 8 generate random numbers of good quality but a ring oscillator 3 (RING OSC 3) generates 0 with a probability of 70% or higher, for example. Some ring oscillators output random numbers in which 0 and 1 are ill balanced in the completely same manner according to measurement of random number characteristics after leaving the ring oscillators for several years since they were produced. A random number of good quality is output in the end since an XOR logical operation is executed on data output from each ring oscillator, but the balance of 0 and 1 of each ring oscillator is fixed.

The embodiment is characterized in authenticating a device on which a set of ring oscillators are mounted by using the fact that changes with time of random numbers generated by multiple ring oscillators included in the random number generation circuit 300 differ depending on the set (combination) of ring oscillators. The ID information generating unit 320 that generates ID information used for authentication applies data of random number strings output from the ring oscillators to a test circuit to generate information indicating what test result is obtained from data (data of the random number strings) output from an n-th ring oscillator of the multiple ring oscillators (the ring oscillator string) (that is information indicating the quality of the random number generated by each ring oscillator) as ID information. In the example of FIG. 8, the circuit configuration allows outputs from the ring oscillators to be branched off and obtained, as indicated by "a", and information indicating the result of testing data of random number strings output from the respective ring oscillators by a test circuit 322 is generated as the ID information.

As an example of generation of the ID information, ring oscillators with a certain balance of 0 and 1, such as higher than 70%, are determined to be "bad" and, the other ring oscillators to be "good" by the test circuit 322 illustrated in FIG. 7 or 8, and the distribution of "good" and "bad" can be used as the ID information. Furthermore, an actual random number test requires test using a statistical theory such as NIST140-2 or SP800-22 issued by National Institute of Standards and Technology or "BSI: Application Note and Interpretation of the Scheme (AIS) 31. Functionality Classes and Evaluation Methodology for Physical Random Number Generators" issued by German Mathematical Society (Deutsche Mathematiker-Vereinigung), and information indicating which test items are passed by data of the random number string output from each ring oscillator (standards corresponding to which test items are met) can be used as the ID information. For example, SP800-22 includes sixteen test items and FIPS140-2 includes four test items, and information indicating a standard corresponding to test items met by each of the ring oscillators can be used as the ID information.

Furthermore, for example, FIPS-140-2 is currently used as part of AIS31, and includes four items of Test T1 (monobit test), Test T2 (poker test), Test T3 (run test), and Test T4 (long run test). If the number of ring oscillators included in a random number generation circuit is ten (N=10), for example and if there is only a test item corresponding to the balance of 0 and 1, only $2^{10}$=1024 pieces of ID information can be generated. If there are four test items, however, $(2^4)^{10}=2^{40}$ pieces of ID information can be generated.

Figure 10:
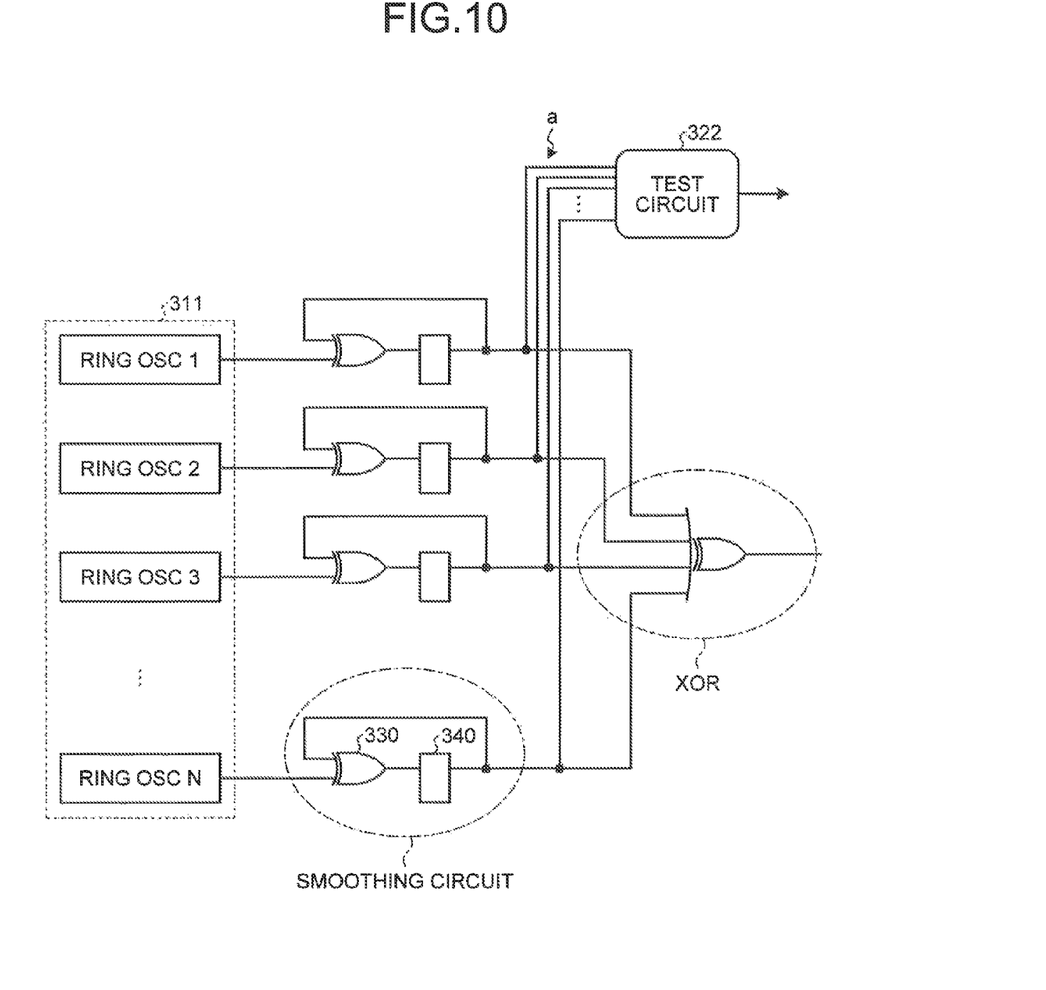
FIG. 10 is a diagram illustrating a detailed exemplary configuration of a random number generation circuit according to a modified example of the second embodiment.

The description is continued referring back to FIG. 7. As illustrated in FIG. 7, the random number generating unit 310 includes a scrambling circuit 311, a smoothing circuit group 312, a test circuit 313, and a random number output unit 314. In this example, the scrambling circuit 311 includes N ring oscillators 1 to N (see FIG. 8). The smoothing circuit group 312 includes multiple smoothing circuits associated one-to-one with the ring oscillators included in the scrambling circuit 311. As described above, each smoothing circuit includes an XOR gate 330 and a flip-flop circuit 340 (see FIG. 8). The test circuit 313 determines whether or not random number string data resulting from smoothing and executing an XOR logical operation meets a standard corresponding to predetermined test items, and passes the random number string data to the random number output unit 314 if it is determined to satisfy the standard. The random number output unit 314 outputs the random number string data (the random number string data determined to meet the standard) passed by the test circuit 313. While ports for taking out random number strings from individual ring oscillators are provided before the smoothing circuits in the example of FIG. 8, the ports for taking out random number strings from individual ring oscillators are not limited, thereto and may be provided after the smoothing circuits associated with the ring oscillators as illustrated in FIG. 10, for example.

Furthermore, as illustrated in FIG. 7, the ID information generating unit 320 includes a challenge signal detecting unit 321, a test circuit 322, a data storage unit 323, a hash generating unit 314, and an ID information output unit 325. The challenge signal detecting unit 321 detects a challenge signal from the reader 20. In the embodiment, when approach of the device 100 to be authenticated is detected, the reader 20 notifies the server 200 that approach of the device 100 to be authenticated is detected. The server 200 in receipt of the notification performs control to transmit a challenge signal requesting information (ID information in this example) indicating the quality of a random number generated by each of the ring oscillators to the device 100 via the reader 20. In this example, upon detection of the challenge signal from the reader 20 (server 200), the challenge signal detecting unit 321 performs control to cause the scrambling circuit 311 operate and generate random numbers by the oscillators.

The test circuit 322 tests the random number string data output from the scrambling circuit 311 on the basis of one or more test items stored in the data storage unit 323. More specifically, the test circuit 322 determines the standard corresponding to which test items of the one or more test items stored in the data storage unit 323 is met by each of the random number string data output from the ring oscillators, and outputs information (may also be referred to as "test result information" in the following description) indicating the determination result to the hash generating unit 324. The hash generating unit 324 determines a hash value (a bit string in this example) corresponding to the test result information from the test circuit 312, and outputs the determined hash value to the ID information output unit 325. The ID information output unit 325 performs control to transmit the hash value generated by the hash generating unit 324 as a response to the challenge signal to the reader 20. The reader 20 then transmits the test result information from the device 100 to the server 200.

The server 200 has the same basic configuration as that in the first embodiment, and the functions of the respective units will be described here with reference to the configuration of FIG. 5 as an example. Upon receiving notification information indicating that approach of the device 100 is detected from the reader 20, the acquiring unit. 201 performs control to transmit a challenge signal requesting information (test result information in this example) indicating the qualities of the random numbers generated by the ring oscillators to the device 100 via the reader 20. The acquiring unit 201 then acquires a hash value corresponding to the test result information from the device 100 via the reader 20.

The storage unit 202 stores a hash value corresponding to factory-default test result information of a second device representing a device that is a reference for authentication as an initial value. In the embodiment, the storage unit 202 stores experimental data for estimating how the test result information changes with time, and the predicting unit 203 predicts test result information each time a certain period elapses (for example, each time a hash value corresponding to the test result information is acquired by the acquiring unit 201) on the basis of the experimental data stored in the storage unit 202, and registers the hash value corresponding to the predicted test result information in the storage unit 202.

The authenticating unit 204 calculates a Hamming distance between a bit string representing the hash value corresponding to the test result information acquired by the acquiring unit 201 and a bit string representing the hash value corresponding to the test result information (the latest hash value registered in the storage unit 202) predicted by the predicting unit 203, and determines that the device 100 to be authenticated falls into the second device if the calculated Hamming distance is equal to or smaller than a threshold.

In the embodiment, authentication of the device 100 to be authenticated is performed on the basis of test result information of the second device, which is a reference for authentication, according to a change with time from the factory-default test, result information (an example of performance information), which also allows highly accurate authentication of the device 100 regardless of the usage of the device 100.

Third Embodiment

Next, a third embodiment will be described. The third embodiment is different from the first embodiment described above in that a device (first device) to be authenticated is an electronic device having a memory cell array including multiple memory cells each using a magnetoresistive element and in that performance information is information, corresponding to the resistance of each magnetoresistive element indicating under control to change the magnetization direction of each magnetoresistive element to parallel magnetization or antiparallel magnetization.

Herein, the electronic device having the memory cell array including multiple memory cells each using a magnetoresistive element is assumed to be an IC card as in the first embodiment and referred to as the device 100. The device 100 according to the embodiment includes an MFAM having a memory cell array including multiple memory cells each using a magnetoresistive element instead of the NAND flash memory 104 illustrated in FIG. 4. Furthermore, the reader and the server have the same basic configurations as those in the first embodiment, and will thus be referred in the same manner (the reader 20 and the server 200) as in the first embodiment.

Furthermore, an example in which a magnetic tunnel junction (hereinafter referred to as "MTJ") element is used as an example of the magnetoresistive element will be described herein. An MTJ element has a structure including two magnetic films and a tunnel insulator therebetween, and the resistance state thereof is determined to be either a high resistance state or a low resistance state according to the relative magnetization direction of the magnetic films. Typically, the resistance is low when the magnetization, direction parallel (parallel magnetization; P state) and the resistance is high when the magnetization direction is antiparallel (antiparallel magnetization; AP state). For reading out a resistance value from an MTJ element of a memory cell, the magnitude of the resistance is determined by comparison with a reference cell generated for comparison. Since information written in a memory cell may be unable to be read out if there is a variation in the resistance of the MTJ elements, the resistance variation of MTJ elements in an MRAM chip manufactured in a typical manner is minimized by designs in the manufacture process. Furthermore, initial failure can be tested before shipment and designs can be made so as not to read out defective bits. As a result, a shipped MRAM can have high capacity memory cells.

Figure 11:
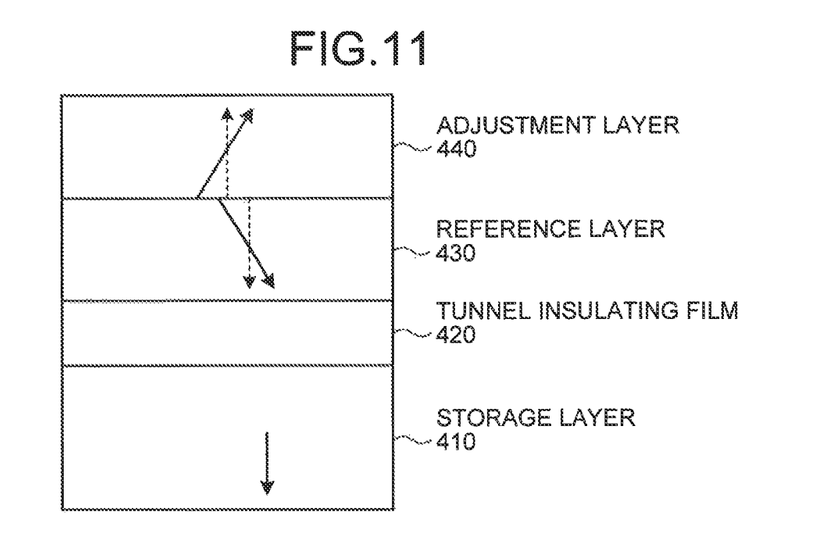
FIG. 11 is a diagram illustrating an exemplary structure of an MTJ element according to a third embodiment.

In the meantime, information, that is, the resistance of an MTJ element is determined by the relative magnetization directions of two magnetic materials. When used as an MRAM, current repeatedly flows through the memory cells for reading and writing, which results in fluctuation of magnetic material information (resistance) due to self-heating of MTJ elements. In an actual MTJ element such as one having a vertical magnetic film, for example, the vertical magnetic film may be formed of two or more layers as illustrated in FIG. 11 instead of the three-layer structure in which a tunnel insulating film simply lies between two magnetic materials. In the example of FIG. 11, the MTJ element has a four-layer structure including a storage layer 410, a tunnel insulating film 420 formed on the storage layer 410, a reference layer 430 formed on the tunnel insulating film 420, and an adjustment layer 440 formed on the reference layer 430. The storage layer 410 has a magnetization direction substantially perpendicular to the film surface that is changed by spin injection. The reference layer 430 and the adjustment layer 440 have different magnetization directions perpendicular to the film surfaces.

Figure 12:
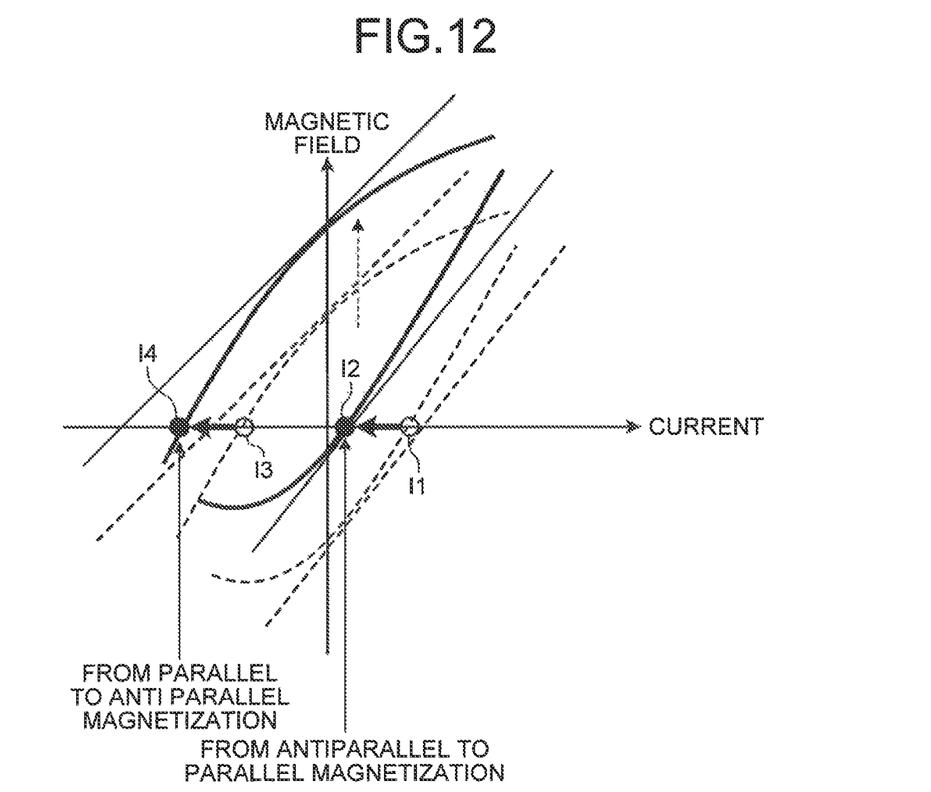
FIG. 12 is a diagram schematically illustrating a change in the current flowing through the MTJ element according to the third embodiment.

It is assumed here that a current of a predetermined value flows through each MTJ element in a direction corresponding to parallel magnetization in an MRAM using magnetization reversal by spin injection so as to change the magnetization direction of each MTJ element to parallel magnetization, for example. In the example of FIG. 12, if no fluctuation of magnetic material information occurs for a certain MTJ element, it is assumed that the current (which can be regarded as information corresponding to the resistance of the certain MTJ element) flowing through the MTJ element at subsequent reading is a current with a current value I1 flowing in the direction (in the positive direction herein) corresponding to the parallel magnetization. If fluctuation of magnetic material information occurs for a certain MTJ element resulting from repeated flow of current for reading and writing (resulting from an increase in the number of uses), the current value to make the magnetization of the certain MTJ element parallel at reading after applying a current to make the magnetization parallel will change to a value different from I1. The example of FIG. 12 shows that the value of the current flowing through the certain. MTJ element is changed to I2.

Furthermore, it is assumed, for example, that a current of a predetermined value is applied to each MTJ element in a direction corresponding to antiparallel magnetization so as to change the magnetization direction of each MTJ element to antiparallel magnetization. In this example, if no fluctuation of magnetic material information occurs for a certain MTJ element, it is assumed that the current value of the current (the current flowing in the negative direction herein) to change the magnetization direction of the MTJ element at subsequent reading will be I3. If, however, fluctuation of magnetic material information occurs for a certain MTJ element, resulting from an increase in the number of uses, for example, the value of the current flowing through the MTJ element changes to a value different from I3 shown in FIG. 12. For example, the example of FIG. 12 shows that the value of the current to change the magnetization direction of the certain MTJ element is changed to I4.

The embodiment is characterized in authenticating a device on which a memory set is mounted by using the fact that a change with time of information corresponding to the resistance of each MTJ element under a control to change the magnetization direction of each MTJ element to parallel magnetization or antiparallel magnetization varies depending on individual memory sets (memory cell arrays). More specific description thereof is given below.

In the embodiment, upon receiving notification information indicating that approach of the device 100 is detected from the reader 20, the server 200 (the acquiring unit 201) performs control to transmit a challenge signal requesting information (ID information in this example, which may be referred to as "resistance pattern information" in the following description) corresponding to the resistance of each MTJ element under control on the device 100 to change the magnetization direction of each MTJ element to parallel magnetization or antiparallel magnetization to the device 100 via the reader 20. Upon detecting the challenge signal transmitted from the reader 20 (server 200), the security/authentication circuit 103 transmits the challenge signal to a drive circuit, which is not illustrated, that drives an MRAM.

The drive circuit in receipt of the challenge signal performs control to apply a current to each MTJ element to change the magnetization direction to parallel magnetization or antiparallel magnetization and then read information (the current in this example) corresponding to the resistance of each MTJ element. The drive circuit then outputs the information (resistance pattern information) obtained by the read control to the security/authentication circuit 103, which in turn performs control to transmit the resistance pattern information to the reader 20 in response to the challenge signal. In this example, the resistance pattern information is expressed by a bit string similarly to the defect pattern information in the first embodiment. The reader 20 transmits the resistance pattern information from the device 100 to the server 200.

The server 200 has the same basic configuration as that in the first embodiment, and the functions of the respective units will be described here with reference to the configuration of FIG. 5 as an example. The acquiring unit 201 acquires the resistance pattern information from the device 100 via the reader 20. The storage unit 202 stores factory-default resistance pattern information of a second device representing a device that is a reference for authentication as an initial value. In the embodiment, the storage unit 202 stores experimental data for estimating how the resistance pattern information changes with time, and the predicting unit 203 predicts resistance pattern information each time a certain period elapses (for example, each time the resistance pattern information is acquired by the acquiring unit 201) on the basis of the experimental data stored in the storage unit 202, and registers the predicted resistance pattern information in the storage unit 202.

The authenticating unit 204 calculates a Hamming distance between a bit string representing the resistance pattern information acquired by the acquiring unit 201 and a bit string representing the resistance pattern information (the latest resistance pattern information registered in the storage unit 202) predicted by the predicting unit 203, and determines that the device 100 to be authenticated falls into the second device if the calculated Hamming distance is equal to or smaller than a threshold.

In the embodiment, authentication of the device 100 to be authenticated is performed on the basis of resistance pattern information of the second device, which is a reference for authentication, according to a change with time from the factory-default resistance pattern information (an example of performance information), which also allows highly accurate authentication of the device 100 regardless of the usage of the device 100.

Modification of Third Embodiment

Note that the design of the magnetic film in the structure of the MTJ element as described above ensures thermal stability. However, fluctuation of the magnetic materials in the magnetization direction due to self-heating of the MTJ element as described above depends heavily on the manner in which the MRAM is used and may thus impart microscopic instability to the magnetic film depending on the heat generation of the MTJ elements. However, since an MRAM is often designed to be reliable on the basis of study of such instability, the instability does not necessarily directly induce error bits. The stability of magnetization on one side that is a reference for the resistance of an MTJ element may only be temporarily worse.

It is therefore possible to perform control to deliberately increase the deterioration in the stability of the MTJ elements and use information corresponding to the resistance of each MTJ element after the control as the ID information of the device 100 on which the MRAM is mounted.

A first specific example is a method of repeating writing. With an MRAM using magnetization reversal by spin injection, a method of applying a current flowing in a direction corresponding to the magnetization direction to which the magnetization is to be changed is typically used for changing (reversing) the magnetization direction of each MTJ element. Since a write current is larger than a read current, Joule heat is generated at the MTJ element and the stability of magnetization on one side that is a reference for the resistance of the MTJ element becomes temporarily worse. In this process, there may be a case in which the magnetization is reversed even if the direction of the write current is normally stabilized to a desired magnetization direction. Thus, information specific to the MRAM can be generated by repeating control to apply a current to each MTJ element to change the magnetization direction to parallel magnetization a predetermined of times and then performing control to read information corresponding to the resistance of each MTJ element, for example. Furthermore, information specific to the MRAM can be generated by repeating control to apply a current to each MTJ element to change the magnetization direction to antiparallel magnetization a predetermined of times and then performing control to read information corresponding to the resistance of each MTJ element, for example.

Thus, information corresponding to the resistance of each MTJ element after control to charge the magnetization direction of the MTJ element to a predetermined direction (parallel magnetization or antiparallel magnetization) is repeated a predetermined number of times may be used as the performance information described above.

A second specific example is a method of repeating reading. Although the value of the current flowing through an MTJ element is smaller for reading than for writing, the circuit configuration of an MRAM may be designed to increase the amount of data read per unit time so as to emphasize the read performance. As a result of imparting a load of applying a current to an MTJ element, Joule heat is generated in the MTJ element and the stability of the magnetization on one side that is a reference for the resistance of the MTJ element becomes temporarily worse. Thus, information specific to the MRAM can be generated by repeating control to read information corresponding to the resistance of each MTJ element a predetermined number of times, and then performing control to apply a current to each MTJ element to change the magnetization direction to parallel magnetization or antiparallel magnetization and then read information corresponding to the resistance of each MTJ element, for example.

Thus, information corresponding to the resistance of each MTJ element after repeating control to read information corresponding to the resistance of each MTJ element a predetermined number of times and then performing control to change the magnetization direction of the MTJ element to parallel magnetization or antiparallel magnetization may be used as the performance information described above.

The authentication process may be performed using a hash function as in the second embodiment described above, or may be performed by using a typical fuzzy logic circuit. Furthermore, the random number generation circuit of the second embodiment may be used in combination with the first embodiment or the third embodiment. For circuitry including both an MRAM and NAND flash memory, the first embodiment and the third embodiment may be combined.

Furthermore, the reader 20 may perform the authentication process, for example. In such a mode, the reader 20 may include the acquiring unit 201, the storage unit 202, the predicting unit 203, and the authenticating unit 204 as described above, for example. In this example, the reader 20 corresponds to an "authentication device" in the claims. Furthermore, while the reader 20 acquires the ID information of the device 100 in a non-contact manner in the embodiments described above, the reader 20 may alternatively acquire information in a contact manner.

Programs to be executed by the server 200 according to the embodiments described above may be stored on a computer system connected to a network such as the Internet, and provided by being downloaded via the network. Alternatively, the programs to be executed by the server 200 according to the embodiments described above may be provided or distributed through a network such as the Internet. Still alternatively, the programs to be executed by the server 200 according to the embodiments described above may be embedded on a nonvolatile recording medium such as a ROM or the like in advance and provided therefrom.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An authentication device comprising:
an acquiring unit configured to acquire performance information of a first device that is a device to be authenticated;
a predicting unit configured to predict performance information of a second device that is a device being a reference for authentication according to a change with time from initial performance information; and
an authenticating unit configured to perform an authentication process of determining whether or not the first device matches the second device on a basis of a degree of agreement between the performance information acquired by the acquiring unit and the performance information predicted by the predicting unit, wherein
the device is an electronic device including NAND flash memory, and
the performance information is information indicating distribution of defective memory cells included in the NAND flash memory or indicating the number of defective memory cells included in the NAND flash memory.

2. An authentication device comprising:
an acquiring unit configured to acquire performance information of a first device that is a device to be authenticated;
a predicting unit configured to predict performance information of a second device that is a device being a reference for authentication according to a change with time from initial performance information; and
an authenticating unit configured to perform an authentication process of determining whether or not the first device matches the second device on a basis of a degree of agreement between the performance information acquired by the acquiring unit and the performance information predicted by the predicting unit, wherein
the device is an electronic device comprising a random number generation circuit including multiple ring oscillators, and
the performance information is information indicating quality of a random number generated by each of the ring oscillators.

3. An authentication device comprising:
an acquiring unit configured to acquire performance information of a first device that is a device to be authenticated;
a predicting unit configured to predict performance information of a second device that is a device being a reference for authentication according to a change with time from initial performance information; and
an authenticating unit configured to perform an authentication process of determining whether or not the first device matches the second device on a basis of a degree of agreement between the performance information acquired by the acquiring unit and the performance information predicted by the predicting unit, wherein
the device is an electronic device comprising a memory cell array including multiple memory cells each using a magnetoresistive element, and
the performance information is information corresponding to resistance of each of the magnetoresistive element when control to change each of the magnetoresistive elements to have parallel magnetization or antiparallel magnetization is performed.

* * * * *